Feb. 10, 1925.
C. F. JENKINS
1,525,552
SQUARE SPOTLIGHT SOURCE
Filed April 21, 1923
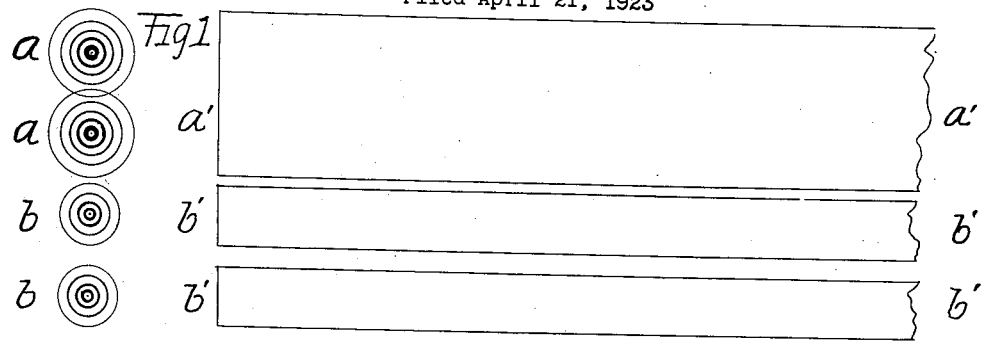
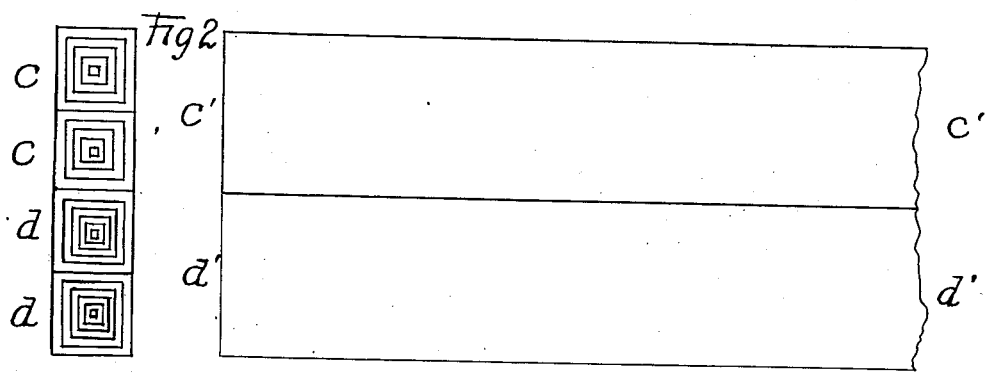
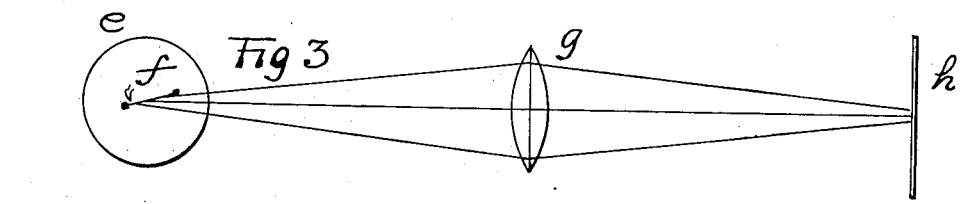
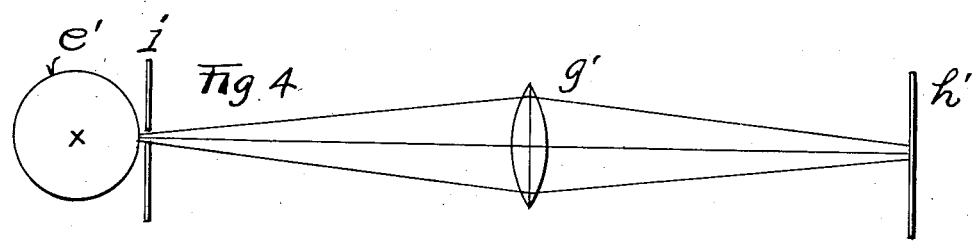
WITNESS:
Sybil Almand.
Inventor
C. Francis Jenkins Patented Feb. 10, 1925.

1,525,552

UNITED STATES PATENT OFFICE.

CHARLES FRANCIS JENKINS, OF WASHINGTON, DISTRICT OF COLUMBIA, ASSIGNOR TO RADIO PICTURES CORPORATION, OF WASHINGTON, DISTRICT OF COLUMBIA, A CORPORATION.

SQUARE SPOTLIGHT SOURCE.

Application filed April 21, 1923. Serial No. 633,651.

*To all whom it may concern:*

Be it known that I, CHARLES FRANCIS JENKINS, citizen of the United States, residing at Washington, District of Columbia, have invented certain new and useful Improvements in a Square Spotlight Source, of which the following is a specification.

This invention relates to improvements in apparatus for sending photographs by radio and has for its object the employment of means which produce lines of uniform width but different degrees of density, in apparatus in which the photograph is built up line by line until the whole surface has thus been covered.

In all efforts heretofore made, so far as applicant is aware, a point source of light has been employed. The result is that when this point source is imaged on a photographic plate, the density of exposure of this spot is greatest in the center and tapers off to nothing in a circular edge.

When, therefore, this spot having a dense center and a thin edge is swept across the photographic plate, obviously the line has its greatest exposure in the center, thinning off to nothing at the edges. By proper adjustment the edges of the several lines can be overlapped onto the edges of adjacent lines to such an extent as to make the exposed area of approximately uniform density, so that a paper print from such a negative does not show lines.

It will also be understood that where the source of light is dimmed to such an extent that it does not expose the plate as the image of the spot sweeps over the plate, areas without any exposure at all result, and from these areas paper prints also are free of lines.

However, in the areas which lie between, that is, in the half-tones, the intensity of the light source is reduced, for example, to one-half its maximum intensity. Therefore, the area of the spot on the plate is but one-half the diameter, and thus the margins of lines made by the travel of this smaller spot over the plate do not touch, and for that reason the half-tones of the photograph show lines very distinctly.

The object of this invention is the employment of a light source, the image of which on the photographic plate will be uniform over its whole area, the source being preferably approximately rectangular. Such a spot when decreased in light intensity will decrease in intensity uniformly over its whole area, and through the whole range of intensities employed, maximum to minimum.

In the drawings Fig. 1 is intended to illustrate a circular spot of light and its effect on the photographic plate; Fig. 2 similarly is intended to represent the effect of a square source of light of uniform intensity; and Fig. 3 and Fig. 4 are schematic drawings of a straight filament and an aperture source of light.

In the drawings AA are circular spots of light of maximum intensity at the center, tapering to zero intensity at the margin; A' to A' the effect of two such spots sweeping over a photographic plate; BB are similar spots of half the intensity, but having the same maximum center to minimum margin variation in intensity; B' to B' the line effect which two such spots produce when swept over a photographic plate.

CC are illustrative of two square spots of uniform intensity over the whole area of each spot, and C' to C' the effect of their movement over a photographic plate. DD are like spots of half the intensity, but similarly uniform in intensity over the whole of their areas, and similarly D' to D' illustrate the effect of these spots moving over a photographic plate, namely, a band similar to the first but of less density, but uniform from edge to edge.

In Fig. 3 E is a hydrogen filled lamp, F a filament therein, G a lens for imaging the filament on the photographic plate H.

In Fig. 4 E' is an incandescent opalescent globe lamp, with an apertured mask I between the lamp and the lens G', and which latter images the glow of the opalescent bulb behind the aperture on to the photographic plate H, the size of the square spot being limited by the aperture.

The illustrations in Fig. 1 are intended to show that while circular spots of uneven intensity from center to margin, properly overlapped, will give an approximately solid area when moving across a photographic plate; the same light source of half the intensity will contract to approximately half the area, and, therefore, moving over a photographic plate draw lines of less density, but lines nevertheless.

The intention of the drawing Fig. 2 is to show how a square light source of uniform intensity over its whole area will, when sweeping over a plate, give a uniform density of exposure from margin to margin; and that the same light source when dimmed to half its intensity will not make lines, but will give a solid area of exposure on the photographic plate, and that this effect persists for all intensities of the light source, i. e., from maximum to minimum.

Obviously, the lines resulting from the movement of such a spot over the photographic negative plate will produce uniform exposure from edge to edge, so that adjacent contacting lines build up areas of uniform density, no matter whether it represents high lights, half-tones or shadows. That is, there are no lines in any part of the picture, the whole being of true photographic quality.

Any one of a number of light sources may be employed which fulfil this condition; for example, a square aperture illuminated on the opposite side from the negative by a light source at such a distance as to give uniform illumination over this square, which latter might be covered with a mat, diffusing surface.

Another light source which gives the same result, and which applicant has employed with successful results, consists of a straight tungsten filament located more or less end-on toward the lens which images it on the photographic plate.

Means for causing modulation in the intensity in either of these light sources is the subject of a separate application, and not being a part of this invention is not believed necessary to describe herein.

What I claim, therefore, as my invention, and which I wish to secure by Letters Patent of the United States, is—

1. In apparatus of the class described, the combination of a light receiving surface, a light source from which light emerges of approximately square area and uniform intensity over its whole area, and means for imaging said source on the light receiving surface.

2. In apparatus of the class described, the combination of a photographic plate, a light source from which light emerges of approximately square area and uniform intensity over its whole area, and means for imaging said source on the photographic plate.

3. In apparatus of the class described, the combination of a photographic plate, a light source consisting of an approximately straight filament so located that the general direction of the length of the filament is pointed toward the photographic plate, and means for imaging the filament on the photographic plate.

4. In apparatus of the class described, the combination of a light receiving surface, a light source, and means for imaging the light source on the receiving surface in such a manner that the image is square and the intensity of the light image shall be approximately uniform over its whole area.

5. In apparatus of the class described, the combination of a photographic surface, a light source, and means for imaging the light source on the photographic surface in such a manner that the image is square and the intensity of the light image shall be approximately uniform over its whole area.

In testimony whereof I have affixed my signature.

CHARLES FRANCIS JENKINS.